(12) United States Patent
Lu

(10) Patent No.: US 7,801,558 B2
(45) Date of Patent: *Sep. 21, 2010

(54) METHOD AND APPARATUS FOR GENERATING CLOCKS FOR A HANDHELD MULTISTANDARD COMMUNICATION SYSTEM

(75) Inventor: Paul Y. Lu, Los Altos, CA (US)

(73) Assignee: Broadcom Corporation

( * ) Notice: Subject to any disclaimer, the term of this patent is extended or adjusted under 35 U.S.C. 154(b) by 158 days.

This patent is subject to a terminal disclaimer.

(21) Appl. No.: 12/098,938

(22) Filed: Apr. 7, 2008

(65) Prior Publication Data
US 2008/0212728 A1 Sep. 4, 2008

Related U.S. Application Data

(63) Continuation of application No. 11/079,865, filed on Mar. 14, 2005, now Pat. No. 7,356,350.

(51) Int. Cl.
*H04B 1/38* (2006.01)
*H04M 1/00* (2006.01)

(52) U.S. Cl. .................. 455/552.1; 455/556.2; 455/574

(58) Field of Classification Search ............. 455/550.1, 455/552.1, 553.1, 574, 556.1, 556.2, 343.1
See application file for complete search history.

(56) References Cited

U.S. PATENT DOCUMENTS

| 6,898,721 | B2* | 5/2005 | Schmidt | 713/322 |
| 7,039,438 | B2* | 5/2006 | Khlat | 455/552.1 |
| 7,356,350 | B2* | 4/2008 | Lu | 455/552.1 |
| 2004/0132421 | A1 | 7/2004 | Underbrink | |
| 2004/0248624 | A1 | 12/2004 | Leclercq | |
| 2005/0042996 | A1 | 2/2005 | Khlat et al. | |

* cited by examiner

*Primary Examiner*—Nguyen Vo
(74) *Attorney, Agent, or Firm*—McAndrews, Held & Malloy, Ltd.

(57) ABSTRACT

Systems and methods for processing signals are disclosed. The method may include, in a communication system comprising a plurality of devices, controlling the supply of one or more clock signals from a first clock source to one or more of the plurality of devices based on a signal communicated from a particular one of the plurality of devices to a second clock source and a request for a clock signal from one of the plurality of devices. The communicated signal may control an accuracy of the second clock source. The particular one of the plurality of devices may have highest accuracy requirements among the plurality of devices. At least one main clock signal may be generated for at least one of the plurality of devices utilizing an input clock signal received from the second clock source.

24 Claims, 4 Drawing Sheets

METHOD AND APPARATUS FOR GENERATING CLOCKS FOR A HANDHELD MULTISTANDARD COMMUNICATION SYSTEM

CROSS-REFERENCE TO RELATED APPLICATIONS/INCORPORATION BY REFERENCE

This application is a continuation of U.S. patent application Ser. No. 11/079,865, filed on Mar. 14, 2005.

FIELD OF THE INVENTION

Certain embodiments of the invention relate to clock signals for electronic circuits. More specifically, certain embodiments of the invention relate to a method and apparatus for generating clocks for a handheld multistandard communication system.

BACKGROUND OF THE INVENTION

Mobile communication systems such as cellular telephones, personal digital assistants (PDAs), and handheld systems are now required to perform more sophisticated communication functions with multiple networks, as well as multimedia functions. For example, a multistandard wireless communication device, such as a cellular handset, may comprise a Bluetooth device for wireless PAN (personal area network) communication, a Wi-Fi device for wireless LAN (local area network) communication, and/or an application processor for playing music and capturing video. Each of the Bluetooth and/or Wi-Fi devices within the cellular handset, as well as the application processor, may utilize a main clock signal for normal mode of operation and a real-time clock signal for standby mode of operation. Consequently, each device within the multistandard wireless communication device may comprise a crystal and an oscillator to generate the main clock signal, and a crystal and/or an oscillator to generate the real-time clock signal. The increased number of crystals and oscillators for a multistandard handheld communication system may result in increased power consumption and cost of implementation.

In order to effectively maximize use of channel bandwidth while permitting a plurality of access devices to share the bandwidth, stringent timing requirements may be utilized by a communication device during synchronization with the network. For example, in GSM, a voltage controlled crystal oscillator (VCXO) may be utilized to generate a 13 MHz clock signal, whose frequency may be calibrated to match the network timing. However, in some communication networks, such as Bluetooth and Wi-Fi networks, network timing requirements may not require a VCXO to generate a clock reference signal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and apparatus for generating clocks for a handheld multistandard communication system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may reduce the number of crystals and oscillators within a multistandard handheld communication system and may comprise utilizing a single clock generation circuitry to supply all main clock signals to all communication and/or application devices integrated within a multistandard handheld communication system. A clock frequency control device may be selected where the selected clock frequency control device may be handling communication with a network that has the highest synchronization accuracy requirement among the plurality of communication and/or application devices, for example. The selected clock frequency control device may generate a signal to a voltage controlled crystal oscillator (VCXO) to adjust its oscillation frequency. The VCXO output may be utilized by the clock generation circuitry to generate one or more clock signals, which may be supplied to all communication and/or application devices within the multistandard handheld communication system as their main clocks.

In an exemplary aspect of the invention, a second clock generation circuitry may be utilized within the multistandard handheld communication system. In this regard, the second clock generation circuitry may be adapted to generate a real-time clock signal for low-power mode operation of a plurality of communication and/or application devices. A real-time clock signal may comprise a clock signal having a frequency suitable for timekeeping, such as 32.768 KHz, for example.

By utilizing centralized main clock and real-time clock generation, the crystals, oscillators, as well as oscillator output amplifiers within the remaining communication and/or application devices within the multistandard handheld communication system, may be removed. In this regard, the power consumption and implementation cost of the multistandard handheld system may be reduced.

Figure 1:
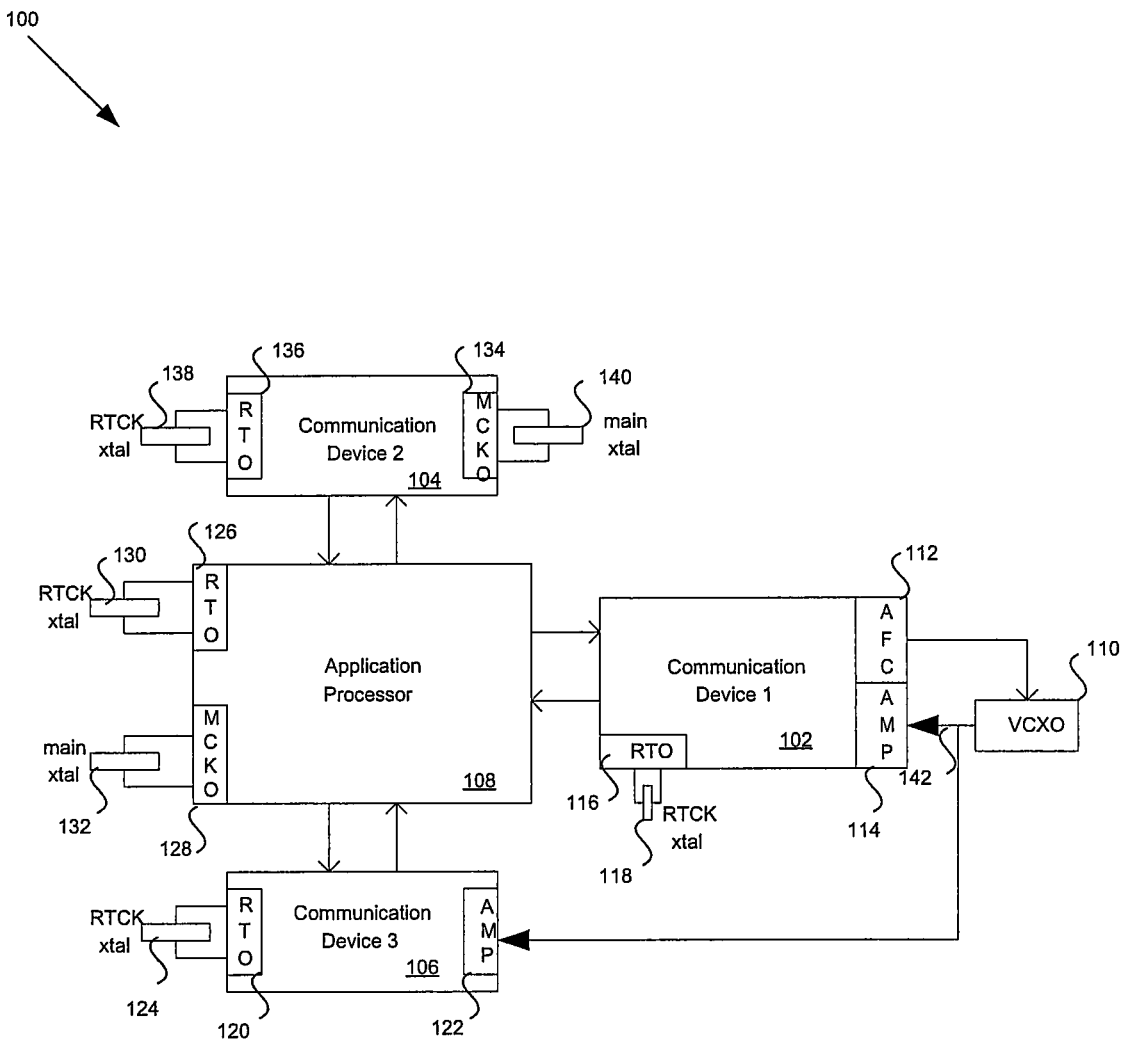
FIG. 1 is a block diagram of a multistandard handheld communication system utilizing a plurality of clock generation devices that may be utilized in accordance with an aspect of the invention.

FIG. 1 is a block diagram of a multistandard handheld communication system utilizing a plurality of clock generation devices that may be utilized in accordance with an aspect of the invention. Referring to FIG. 1, the multistandard handheld communication system 100 may comprise a plurality of communication devices, such as communication devices 102, 104, and 106, and an application processor 108. Each of the communication devices 102, 104, 106 and application processor 108 may each comprise a clock generation source. The clock generation source may generate main clock signals and/or a real-time clock signal that may be utilized during a low-power, or standby, mode of operation.

The communication device 102 may comprise a voltage controlled crystal oscillator (VCXO) 110 for a main clock signal, an input amplifier 114, an automatic frequency control (AFC) block 112 for the VCXO 110, a watch crystal 118, and a real-time clock oscillator (RTO) 116 for a real-time clock signal. The automatic frequency control block 112 may comprise suitable circuitry, logic, and/or code and may be adapted to generate a voltage control signal for the VCXO 110. By fine-tuning a voltage of the VCXO 110, the frequency of an output clock signal 142 of the VCXO 110 may be more accurately controlled. After generation of the voltage control signal, the output clock signal 142 may be communicated to the amplifier 114 for further amplification. The amplified clock signal may then be utilized as a reference to generate all clocks inside the communication device 102 during a normal mode of operation. Although the VCXO 110 as shown is not integrated within the communication device 102, the present invention is not so limited. Accordingly, in another embodiment of the invention, the VCXO 110 may be integrated within the communication device 102.

The watch crystal 118 may be adapted to generate a reference frequency, such as 32.768 kHz, where $2^{15}$ ticks of the clock indicate 1 second of elapsed time. The reference frequency generated by the watch crystal 118 may be utilized by the oscillator 116 to generate a real-time clock signal. As a result, communication device 102 may utilize the watch crystal 118 and oscillator 116 to generate the real-time clock signal for keeping track of the watch time as well as for providing a clock signal during a low-power, or standby, mode of operation.

In an exemplary aspect of the invention, one or more of the communication devices 102, 104, 106 and/or the application processor 108 may be adapted to utilize the same VCXO output for generation of a main clock signal. For example, communication device 106 may be adapted to utilize the main clock signal 142 generated by the VCXO 110 of communication device 102.

The communication device 106 may comprise an oscillator 120, a watch crystal 124, and an amplifier 122. After a clock signal 142 is generated by VCXO 110, the clock signal 142 may be communicated to the amplifier 122 for further amplification. The amplified clock signal may then be utilized to generate clock signals inside the communication device 106 during a normal mode of operation. The watch crystal 124 may be adapted to generate a reference frequency, such as 32.768 kHz, where $2^{15}$ ticks of the clock indicate 1 second of elapsed time. The reference frequency generated by the watch crystal 124 may be utilized by the oscillator 120 to generate a real-time clock signal. As a result, the communication device 106 may utilize the watch crystal 124 and oscillator 120 to generate the real-time clock signal for keeping track of the watch time for communication device 106 as well as for providing a clock signal during a low-power, or standby, mode of operation.

The communication device 104 may comprise a main crystal 140, a main clock oscillator (MCKO) 134, a watch crystal 138, and a real-time clock signal oscillator (RTO) 136. The main crystal 140 and the MCKO 134 may be adapted to generate a main clock signal. The main clock signal may be utilized to generate a plurality of clock signals, for example, inside the communication device 104 during a normal mode of operation. The watch crystal 138 may be adapted to generate a reference frequency, such as 32.768 kHz, where $2^{15}$ ticks of the clock indicate 1 second of elapsed time. The reference frequency generated by the watch crystal 138 may be utilized by the oscillator 136 to generate a real-time clock signal. As a result, the communication device 104 may utilize the watch crystal 138 and the RTO 136 to generate the real-time clock signal for keeping track of the watch time for communication device 104, as well as for providing a clock signal during a low-power, or standby, mode of operation.

The application processor 108 may comprise a main crystal 132, a main clock oscillator (MCKO) 128, a watch crystal 130, and a real-time clock oscillator (RTO) 126. The main crystal 132 and the MCKO 128 may be adapted to generate a main clock signal. The main clock signal may be utilized to generate a plurality of clock signals inside the application processor 108 during a normal mode of operation. The watch crystal 130 may be adapted to generate a reference frequency, such as 32.768 kHz, where $2^{15}$ ticks of the clock indicate 1 second of elapsed time. The reference frequency generated by the watch crystal 130 may be utilized by the RTO 126 to generate a real-time clock signal. As a result, the application processor 108 may utilize the watch crystal 130 and the RTO 126 to generate the real-time clock signal for keeping track of the watch time for the application processor 108 as well as for providing a clock signal during a low-power, or standby, mode of operation.

In an exemplary aspect of the invention, the multistandard handheld communication system 100 may be adapted to utilize a single main clock signal generation device and a single real-time clock signal generation device to further improve clock signal processing and reduce system implementation costs by reducing the number of crystals utilized within the multistandard handheld communication device 100.

Figure 2:
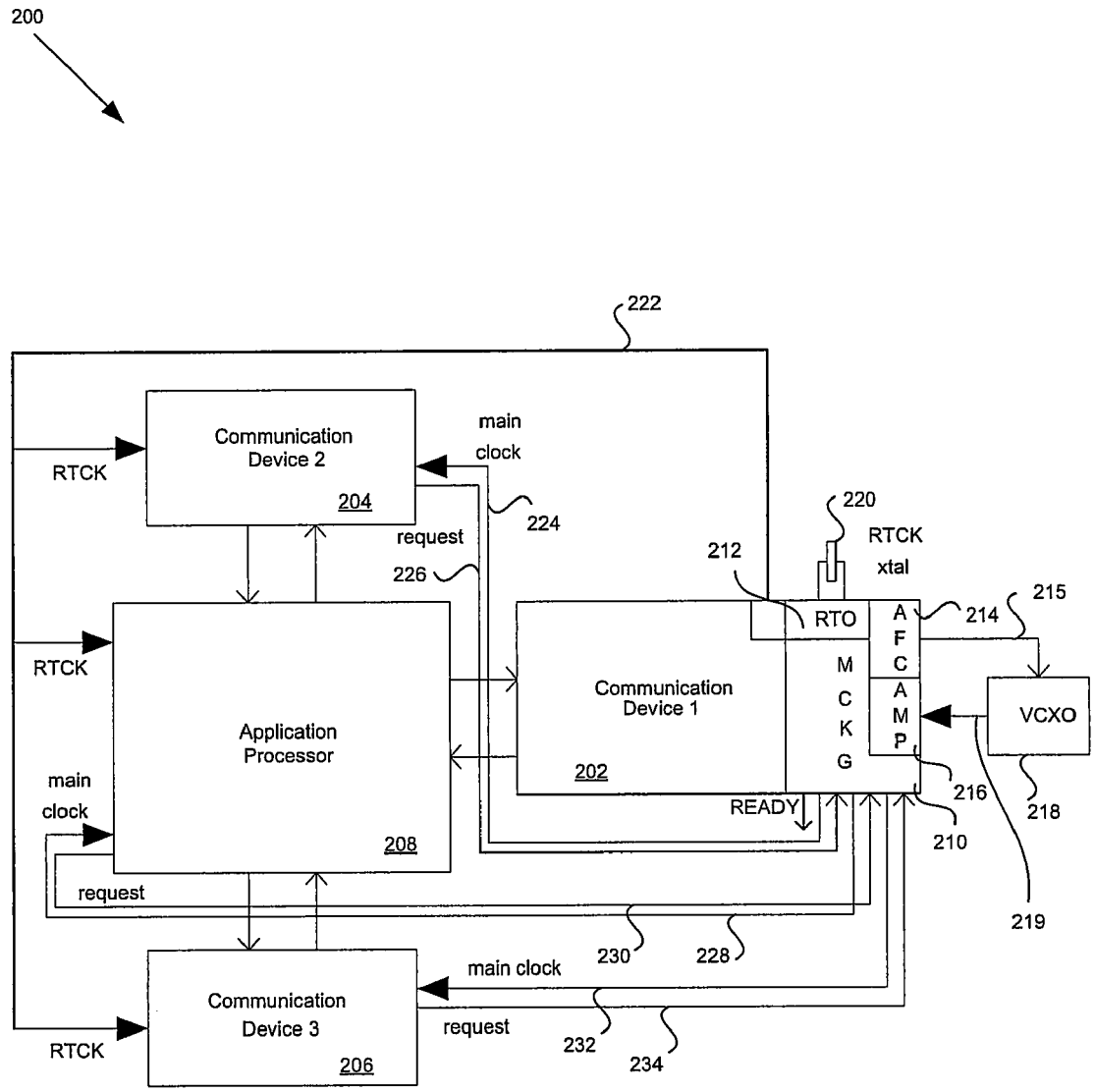
FIG. 2 is a block diagram of a multistandard handheld communication system utilizing a single main clock generator and a single real-time clock generator, in accordance with an embodiment of the invention.

FIG. 2 is a block diagram of a multistandard handheld communication system utilizing a single main clock generator and a single real-time clock generator, in accordance with an embodiment of the invention. Referring to FIG. 2, the multistandard handheld communication device 200 may comprise a plurality of communication devices, such as communication devices 202, 204, and 206, and an application processor 208. The communication device 202 may comprise a cellular communication device, for example, and may be adapted to generate a main clock signal and/or a real-time clock signal that may be utilized during a low-power, or standby, mode of operation.

The communication device 202 may comprise a main clock signal generator (MCKG) 210, a real-time clock signal oscillator (RTO) 212 for a real-time clock signal, and a watch crystal 220. The MCKG 210 may comprise a voltage controlled crystal oscillator (VCXO) 218, an automatic frequency control (AFC) block 214, and an amplifier 216. The AFC block 214 may comprise suitable circuitry, logic, and/or code and may be adapted to generate a voltage control signal 215 for the VCXO 218. By fine-tuning a voltage of the VCXO 218, the frequency of the output clock signal 219 of the VCXO 218 may be more accurately controlled and synchronized with the network timing.

After generation of the voltage control signal 215 by the AFC block 214, the resulting output clock signal 219 may be communicated to the amplifier 216 for further amplification. The amplified clock signal may then be utilized by the main clock generator (MCKG) 210 to generate clock signals of various frequencies. The clock signals may be used within the communication device 202, and/or communicated as main clock signals to the communication device 206, the communication device 204, and/or to the application processor 208.

Although the VCXO 218 as shown is not integrated within the communication device 202, the present invention is not so limited. Accordingly, in another embodiment of the invention, the VCXO 218 may be integrated within the communication device 202.

The watch crystal 220 may be adapted to generate a reference frequency, such as 32.768 kHz, where $2^{15}$ ticks of the clock indicate 1 second of elapsed time. The reference frequency generated by the watch crystal 220 may be utilized by the oscillator 212 to generate a real-time clock signal 222. The real-time clock signal may be utilized within the communication device 202 and/or it may be communicated as a real-time clock signal to the host processor 208, the communication device 204, and/or to the communication device 206 for use during low-power mode of operation, for example. While the RTO 212 is enabled, it may be adapted to continuously generate the real-time clock signal 222.

In an exemplary aspect of the invention, after the clock generation device 202 is selected within the multistandard handheld device 200, the application processor 208 and the remaining communication devices 204 and 206 may be adapted to communicate a clock ON command through one or more clock request signals to the MCKG 210. For example, the host processor 208 and the communication devices 204 and 206 may communicate clock request signals 230, 226, and 234, respectively, to the MCKG 210. In response, the MCKG 210 may communicate back main clock signals 228, 224, and 232 to the host processor 208 and the communication devices 204 and 206, respectively. Further, real-time clock signals may be communicated to the host processor 208 and to the communication devices 204 and 206 via the real-time clock signal 222. The supplying of the main clock signals to the application processor 208 and/or to the communication devices 204 and 206 may be terminated by issuing a clock OFF command through a request signal communicated by the corresponding device to the MCKG 210.

In another aspect of the invention, one or more of the communication and/or application devices within the multistandard handheld communication system 200 may switch to a low-power mode. In such circumstances, a device may issue an OFF command to the MCKG 210 to terminate providing its main clock signal. The device may then utilize the real-time clock signal 222, which may be enabled during the low-power mode of operation. To switch the device out of low-power mode, an ON command may be communicated to the MCKG 210. The MCKG 210 may then resume providing a main clock signal to one or more communication devices.

In yet another aspect of the invention, all the communication and/or application devices may communicate OFF commands to the MCKG 210. The MCKG 210 may then shut down its clock generation circuitry as well as the VCXO 218 to save power. When any of the communication and/or application devices communicate an ON command, the MCKG 210 may then enable the VCXO 218 and its clock generation circuitry. After the VCXO 218 and the clock generation circuitry are stabilized, the MCKG 210 may assert a READY signal indicating that the MCKG 210 is ready to provide main clock signals to the devices within the multistandard handheld communication system 200.

Even though communication device 202 is selected to control the VCXO 218 oscillation frequency within the multistandard handheld system 200, the present invention is not so limited. Accordingly, in another embodiment of the invention, another communication device may be selected to control the VCXO 218 frequency within the multistandard handheld communication system 200, if that device is communicating with a network that requires higher synchronization accuracy, for example.

Figure 3:
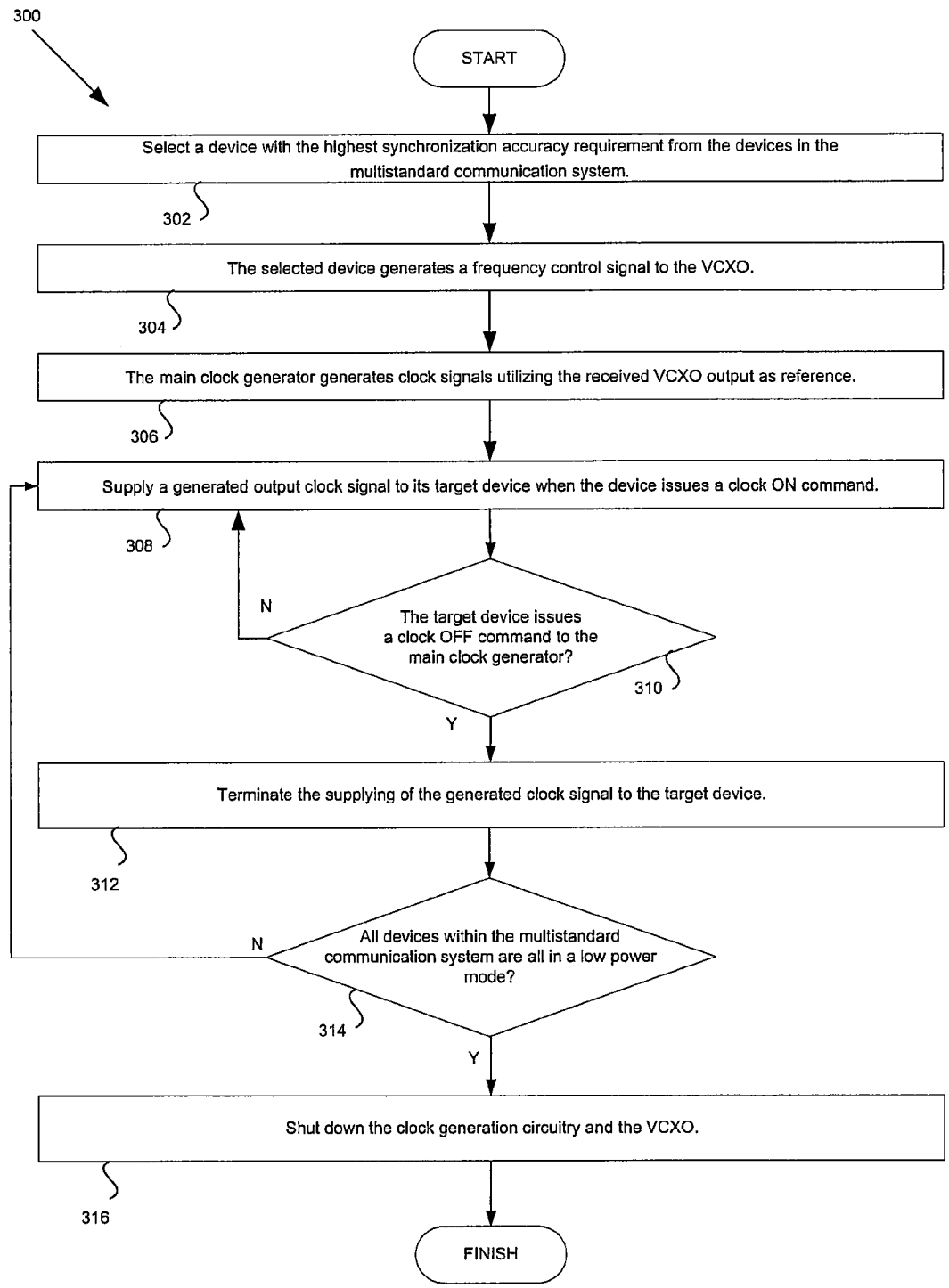
FIG. 3 is a flow chart illustrating exemplary steps that may be utilized for providing main clock signals within a multistandard handheld communication system, in accordance with an embodiment of the invention.

FIG. 3 is a flow chart 300 illustrating exemplary steps that may be utilized for providing main clock signals within a multistandard handheld communication system, in accordance with an embodiment of the invention. Referring to FIG. 3, at 302, a communication or application device with the highest synchronization accuracy requirement may be selected from a plurality of communication and/or application devices within a multistandard handheld communication system. At 304, the selected device may generate a frequency control signal to adjust a VCXO oscillation frequency. At 306, a main clock generator (MCKG) may utilize the clock signal received from the VCXO to generate the main clock signals for all the communication and/or application devices in the system.

At 308, each generated output clock signal may be supplied to a communication device within the multistandard handheld communication system when the device issues a clock ON command to the MCKG. At 310, the MCKG may monitor whether a target device issues a clock OFF command to the MCKG. If the target device issues a clock OFF command to the MCKG, at 312, the supplying of the generated clock signal to the communication device may be terminated. At 314, it may be determined whether the communication devices within the multistandard handheld communication system are all in a low power mode. If the communication devices within the multistandard handheld communication system are all in a low power mode, at 316, the clock generation circuitry and the VCXO may be disabled.

Figure 4:
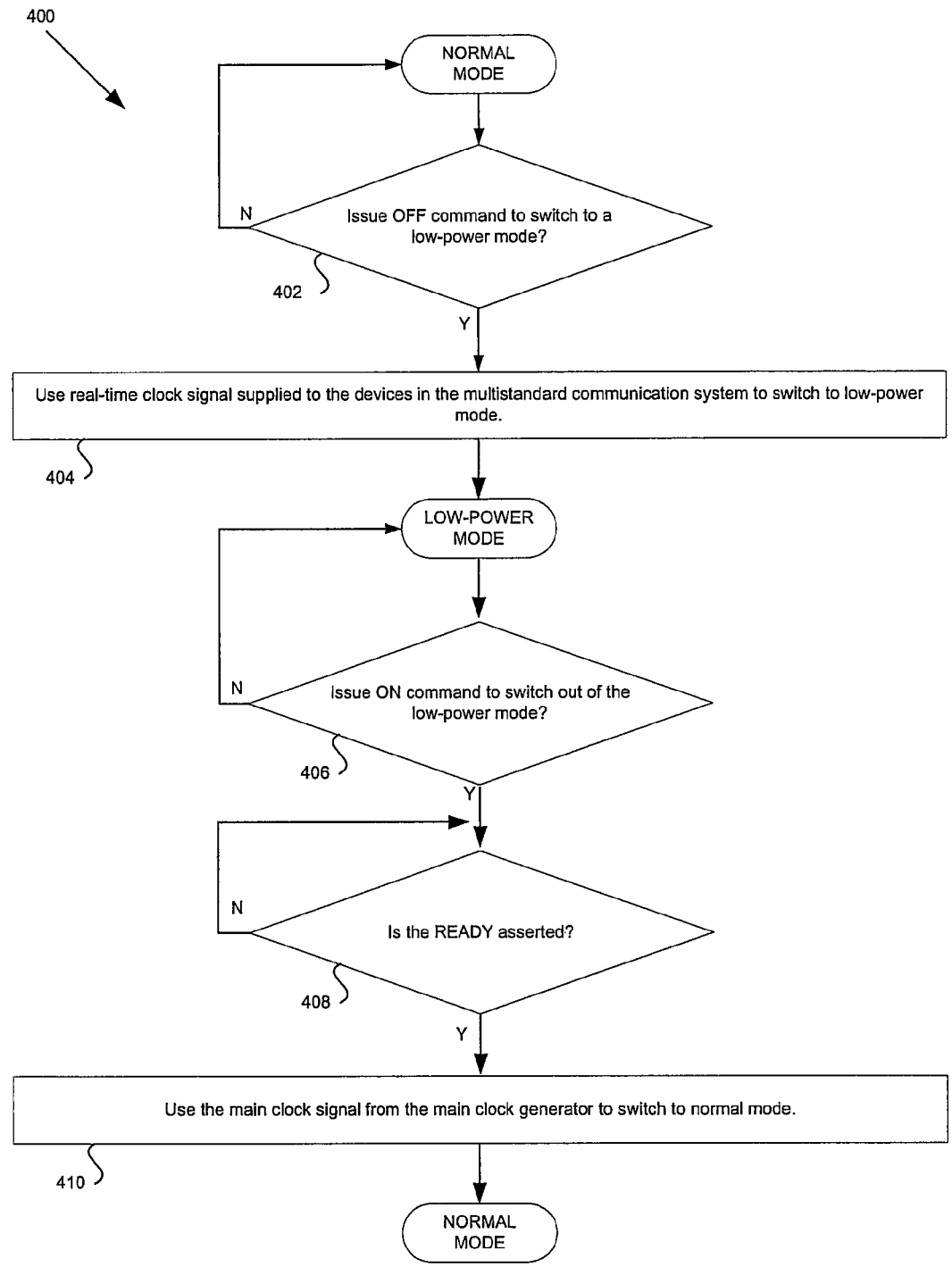
FIG. 4 is a flow chart illustrating exemplary steps that may be utilized for switching a device in and out of normal mode and low-power mode within a multistandard handheld communication system, in accordance with an embodiment of the invention.

FIG. 4 is a flow chart 400 illustrating exemplary steps that may be utilized for switching a device in and out of normal mode and low-power mode, in accordance with an embodiment of the invention. Referring to FIG. 4, at 402, when the device has to switch to a low-power, or standby, mode of operation, it may issue an OFF command to the MCKG to terminate the supply of its main clock signal. At 404, the device may switch to a low-power mode of operation using the real-time clock signal supplied by the centralized clock generation device to the communication and/or application devices within a multistandard handheld communication system.

At 406, when the device has to switch out of the low-power mode, it may issue an ON command to the MCKG to request the supply of its main clock signal. At 408, it may be determined whether a READY signal is asserted. If a READY signal is asserted, at 410, the device may switch out of the low-power mode to normal mode utilizing a main clock signal generated by the MCKG for normal mode operation.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
  in a communication system comprising a plurality of devices, controlling the supply of one or more clock signals from a first clock source to one or more of said plurality of devices based on:
  a signal communicated from a particular one of said plurality of devices to a second clock source, wherein said communicated signal controls an accuracy of said second clock source; and
  a request for a clock signal from one of said plurality of devices.

2. The method according to claim 1, wherein said particular one of said plurality of devices has highest accuracy requirements among said plurality of devices.

3. The method according to claim 1, comprising generating at least one main clock signal for at least one of said plurality of devices utilizing an input clock signal received from said second clock source.

4. The method according to claim 3, comprising supplying said generated at least one main clock signal to said at least one of said plurality of devices within said communication system in response to receiving said request for said clock signal.

5. The method according to claim 4, comprising receiving at least one clock request signal that controls said supplying of said generated at least one main clock signal to said at least one of said plurality of devices.

6. The method according to claim 5, wherein said received at least one clock request signal comprises one or both of a clock ON command and/or a clock OFF command.

7. The method according to claim 3, comprising, if said generated at least one main clock signal is ready for use, asserting at least one READY signal.

8. The method according to claim 3, comprising, if said at least one of said plurality of devices communicates a clock ON command, supplying said generated at least one main clock signal to said at least one of said plurality of devices.

9. The method according to claim 3, comprising, if each of said plurality of devices communicates a clock OFF command, disabling said generation of said at least one main clock signal.

10. The method according to claim 1, comprising generating a real-time clock signal for low-power mode operation of said plurality of devices.

11. The method according to claim 10, comprising generating said real-time clock signal for said plurality of devices by a real-time clock signal source.

12. The method according to claim 11, comprising supplying said generated real-time clock signal to each of said plurality of devices.

13. A system for processing signals, the system comprising:
  at least one circuitry in a communication system comprising a plurality of devices, said at least one circuitry controls the supply of one or more clock signals from a first clock source to one or more of said plurality of devices based on:
  a signal communicated from a particular one of said plurality of devices to a second clock source, wherein said communicated signal controls an accuracy of said second clock source; and
  a request for a clock signal from one of said plurality of devices.

14. The system according to claim 13, wherein said particular one of said plurality of devices has highest accuracy requirements among said plurality of devices.

15. The system according to claim 13, wherein said at least one circuitry generates at least one main clock signal for at least one of said plurality of devices utilizing an input clock signal received from said second clock source.

16. The system according to claim 15, wherein said at least one circuitry supplies said generated at least one main clock signal to said at least one of said plurality of devices within said communication system in response to receiving said request for said clock signal.

17. The system according to claim 16, wherein said at least one circuitry receives at least one clock request signal that controls said supplying of said generated at least one main clock signal to said at least one of said plurality of devices.

18. The system according to claim 17, wherein said received at least one clock request signal comprises one or both of a clock ON command and/or a clock OFF command.

19. The system according to claim 15, wherein said at least one circuitry asserts at least one READY signal, if said generated at least one main clock signal is ready for use.

20. The system according to claim 15, wherein said at least one circuitry supplies said generated at least one main clock signal to said at least one of said plurality of devices, if said at least one of said plurality of devices communicates a clock ON command.

21. The system according to claim 15, wherein said at least one circuitry disables said generation of said at least one main clock signal, if each of said plurality of devices communicates a clock OFF command.

22. The system according to claim 13, wherein said at least one circuitry generates a real-time clock signal for low-power mode operation of said plurality of devices.

23. The system according to claim 22, wherein said at least one circuitry generates said real-time clock signal for said plurality of devices by a real-time clock signal source.

24. The system according to claim 23, wherein said at least one circuitry supplies said generated real-time clock signal to each of said plurality of devices.

* * * * *